US011002964B2

(12) United States Patent
Harvey et al.

(10) Patent No.: US 11,002,964 B2
(45) Date of Patent: May 11, 2021

(54) HEADS UP DISPLAY UNIT ASSEMBLY GUIDE AND PROTECTOR

(71) Applicant: Toyota Motor Engineering & Manufacturing North America, Inc., Plano, TX (US)

(72) Inventors: Andrew W. Harvey, South Lyon, MI (US); Jonathan Joseph Quijano, Ann Arbor, MI (US); Thomas Edward Whitaker, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 196 days.

(21) Appl. No.: 16/427,062

(22) Filed: May 30, 2019

(65) Prior Publication Data

US 2020/0379255 A1 Dec. 3, 2020

(51) Int. Cl.
  *G02B 27/01* (2006.01)
  *B60R 11/02* (2006.01)
  *B62D 25/14* (2006.01)
  *B60R 11/00* (2006.01)

(52) U.S. Cl.
  CPC ...... *G02B 27/0149* (2013.01); *B60R 11/0235* (2013.01); *B62D 25/14* (2013.01); *B60R 2011/0005* (2013.01); *G02B 2027/0169* (2013.01)

(58) Field of Classification Search
  CPC ........ G02B 27/0149; G02B 2027/0169; B60R 11/0235; B60R 2011/0005; B62D 25/14
  USPC ...................................................... 296/37.12
  See application file for complete search history.

(56) References Cited

U.S. PATENT DOCUMENTS

| 6,709,041 | B1 * | 3/2004 | Hotary ................. B60K 37/00 296/70 |
| 6,989,934 | B2 | 1/2006 | Aoik et al. |
| 7,896,396 | B2 | 3/2011 | Braun et al. |
| 9,041,740 | B2 | 5/2015 | Sugiyama et al. |
| 9,188,780 | B2 | 11/2015 | Potakowskyj |
| 9,457,720 | B2 | 10/2016 | Pilkington et al. |
| 9,718,360 | B2 | 8/2017 | Yang |
| 9,817,234 | B2 * | 11/2017 | Quiroz de la Mora ...................... G02B 27/0149 |

(Continued)

FOREIGN PATENT DOCUMENTS

WO WO2008031789 3/2008
WO WO2014171280 10/2014

(Continued)

*Primary Examiner* — Pinel E Romain
(74) *Attorney, Agent, or Firm* — Snell & Wilmer LLP

(57) ABSTRACT

Methods, systems, devices and apparatuses for a heads up display (HUD) unit assembly. The HUD unit assembly includes a HUD guard device. The HUD guard device has a first elongated member. The first elongated member is position on one or more surfaces of the HUD unit and along an edge of the HUD unit and is configured to protect the one or more surfaces of the HUD unit and the edge of the HUD unit during installation of an instrument panel. The HUD guard device has a first leg member and a second leg member. The first leg member and the second leg member each have a first end and a second end. The first ends are coupled to the first elongated member and the second ends are configured to couple and interface with the HUD unit to support the first elongated member.

20 Claims, 10 Drawing Sheets

(56) References Cited

U.S. PATENT DOCUMENTS

| | | | |
|---|---|---|---|
| 10,036,941 B2 | 7/2018 | Takahashi et al. | |
| 10,115,218 B2 | 10/2018 | Hisada et al. | |
| 10,573,093 B2 * | 2/2020 | Breed | G07C 5/008 |
| 2010/0253489 A1 * | 10/2010 | Cui | G01S 13/867 |
| | | | 340/425.5 |
| 2014/0159994 A1 | 6/2014 | Garcia | |
| 2017/0003787 A1 | 1/2017 | Beraud | |
| 2017/0022767 A1 | 1/2017 | Baustad | |

FOREIGN PATENT DOCUMENTS

| | | |
|---|---|---|
| WO | WO2016198924 | 12/2016 |
| WO | WO2018197391 | 11/2018 |

* cited by examiner

HEADS UP DISPLAY UNIT ASSEMBLY GUIDE AND PROTECTOR

BACKGROUND

Field

This disclosure relates to a heads up display unit assembly guide and guard to protect the heads up display unit during assembly.

Description of the Related Art

The heads up display (HUD) unit of a vehicle is typically installed directly to the instrument panel (IP) during a subassembly process and then the HUD and instrument panel are brought over to the vehicle together as a subassembly module and installed to the vehicle cowl (i.e., front interior wall between the engine compartment and passenger compartment).

However, in some designs, the HUD unit is preinstalled directly to the cowl and then the IP subassembly is brought over. When the HUD is preinstalled directly to the cowl and the IP subassembly is brought over, there is a danger that the instrument panel may crash into the HUD unit during installation of the instrument panel.

Accordingly, there is a need for a system, apparatus or device to protect the HUD when the IP subassembly is installed.

SUMMARY

In general, one aspect of the subject matter described in this disclosure may be embodied in a heads up display (HUD) unit assembly. The HUD unit assembly includes a HUD guard device. The HUD guard device has a first elongated member. The first elongated member is positioned on one or more surfaces of the HUD unit and along an edge of the HUD unit. The first elongated member is configured to protect the one or more surfaces of the HUD unit and the edge of the HUD unit during installation of an instrument panel of the vehicle. The HUD guard device has a first leg member and a second leg member. The first leg member and the second leg member each have a first end and a second end. The first ends are coupled to the first elongated member and the second ends are configured to couple and interface with the HUD unit to support the first elongated member.

These and other embodiments may optionally include one or more of the following features. The first elongated member may have a first planar portion and a second planar portion. The first planar portion may be parallel to a top surface of the HUD unit. The second planar portion may be perpendicular to the top surface of the HUD unit and parallel to a side surface of the HUD unit. The first planar portion and the second planar portion may be integrally formed to conform or wrap around the edge of the HUD unit. The first planar portion may interface with and protect the top surface of the HUD unit and the second planar portion may interface with and protect the side surface of the HUD unit.

The first leg member and the second leg member may each have a foot member. The foot members may each have an opening that is configured to receive a fastener that may be inserted into the openings to fasten the foot members and the HUD unit to a dash panel of the vehicle.

The HUD guard device may have a first curved portion. The first curved portion may have a first end that may be integrally formed with the first elongated member and a second end that may be opposite the first end and may be angled perpendicular to the first end. The HUD guard device may have a second elongated member that may be coupled to or integrally formed with the second end of the first curved portion. The HUD guard device may have a second curved portion. The second curved portion may have a first end that may be integrally formed with the second elongated member and a second end that may be opposite the first end and may be angled perpendicular to the first end of the second curved portion. The second end of the second curved portion may be parallel to the first elongated member. The HUD guard device may have at third elongated member that may be coupled to or integrally formed with the second end of the second curved portion.

The HUD guard device may have a third leg member. The third leg member may have a first end and a second end. The first end may be coupled to or integrally formed with the third elongated member and the second end may be configured to couple and interface with the HUD unit. The third leg member may have a foot member. The foot member may have an opening that is configured to receive a fastener that is inserted into the opening to fasten the foot member of the third leg member and the HUD unit to a dash panel of the vehicle. The first curved portion, the second curved portion, the first elongated member, the second elongated member and the third elongated member may be integrally formed and may be formed from a rigid material.

In another aspect, the subject matter may be embodied in an instrument panel guard device. The instrument panel guard device has a top surface, a bottom surface and a back surface. The top surface has a distal portion that is angled downward when installed and a proximal portion that is angled upward away from a portion of a defroster nozzle that holds the instrument panel guard device. The bottom surface has a distal portion, a proximal portion and a center portion between the distal portion and the proximal portion. The back surface is coupled in between the top surface and the back surface. The back surface is angled substantially parallel to the portion of the defroster nozzle and is configured to interface with and couple to the portion of the defroster nozzle.

In another aspect, the subject matter may be embodied in a heads up display assembly for a vehicle. The heads up display assembly includes a heads up display unit that is configured to display information to a user of the vehicle. The heads up display assembly includes an instrument panel guard device positioned on a defroster nozzle to guide installation of an instrument panel. The heads up display assembly includes a heads up display guard device positioned along a perimeter of the heads up display unit and configured to protect the heads up display unit from damage during installation of the instrument panel.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatuses, assemblies and devices to protect the HUD and the IP during installation. Particular embodiments of the subject matter described in this disclosure may be implemented to realize one or more of the following advantages. The heads up display (HUD) unit and instrument panel (IP) guard assembly ("HUD unit assembly") protects the HUD unit during the subassembly process of the instrument panel to the cowl of the vehicle. Since the HUD unit is installed high and forward toward the front of the vehicle on the dash panel, the instrument panel may crash into the HUD unit during the installation process. The HUD unit assembly protects the HUD unit when the instrument panel is installed over the HUD unit.

The HUD unit assembly includes a HUD guard device and an IP guard device. The HUD guard device and the IP guard device protect the HUD unit that is preinstalled directly to the cowl of the vehicle during the installation of the IP and is configured to guide and support the installation of the instrument panel 116. The HUD guard device acts as a protective barrier along the perimeter of the HUD unit when the instrument panel 116 is installed.

Other benefits and advantages include having an IP guard device. The IP guard device prevents the IP from colliding with the HUD unit during installation of the IP and guides the installation of the instrument panel 116 to the final installed location. The instrument panel 116 may use a leading tapered edge to guide the instrument panel 116 into the final installed location on the dash panel of the vehicle.

Figure 1:
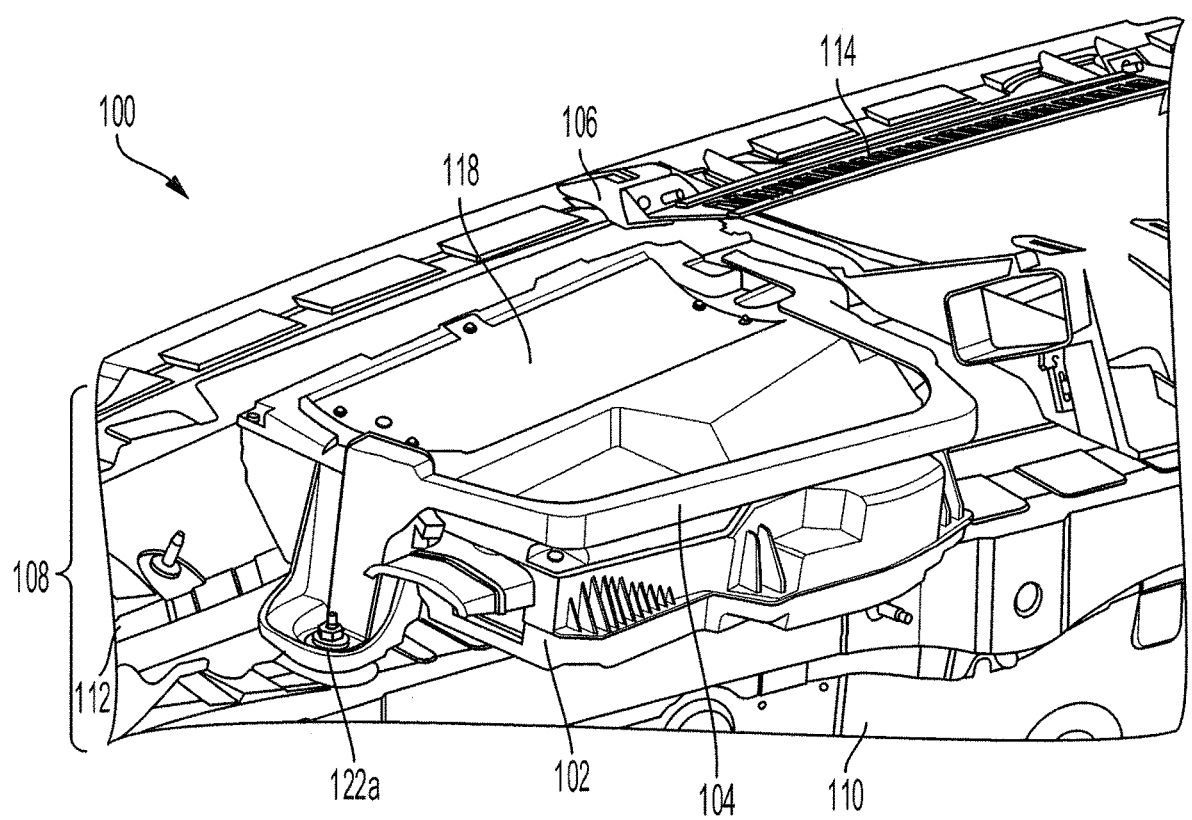
FIG. 1 shows an example interior view of a heads up display (HUD) unit assembly according to an aspect of the invention.

FIG. 1 shows the heads up display (HUD) unit assembly 100. The HUD unit assembly 100 includes a HUD subassembly and an IP subassembly. The HUD subassembly includes the HUD unit 102, which may have approximate dimensions of 237.838 mm×411.188 mm×110.082 mm (Length×Width×Height), and a HUD guard device 104, which may have approximate dimensions of 201.536 mm×364.873 mm×96.495 mm (Length×Width×Height). The IP subassembly includes an instrument panel (IP) guard device 106, which may have approximate dimensions of 52.531 mm×31.217 mm×21.338 mm (Length×Width×Height), an instrument panel 116 and/or a defroster nozzle 114. The HUD unit assembly 100 may include, couple to, connect to or be retro-fitted to other vehicle components including a dash panel 108 and/or dash silencer pad 212. The dash panel 108 may include or house a cowl 110 and/or a reinforcement portion 112. The dash panel 108 may be housed within the cabin, below the windshield and in front of the passenger compartment, for example.

Figure 2A:
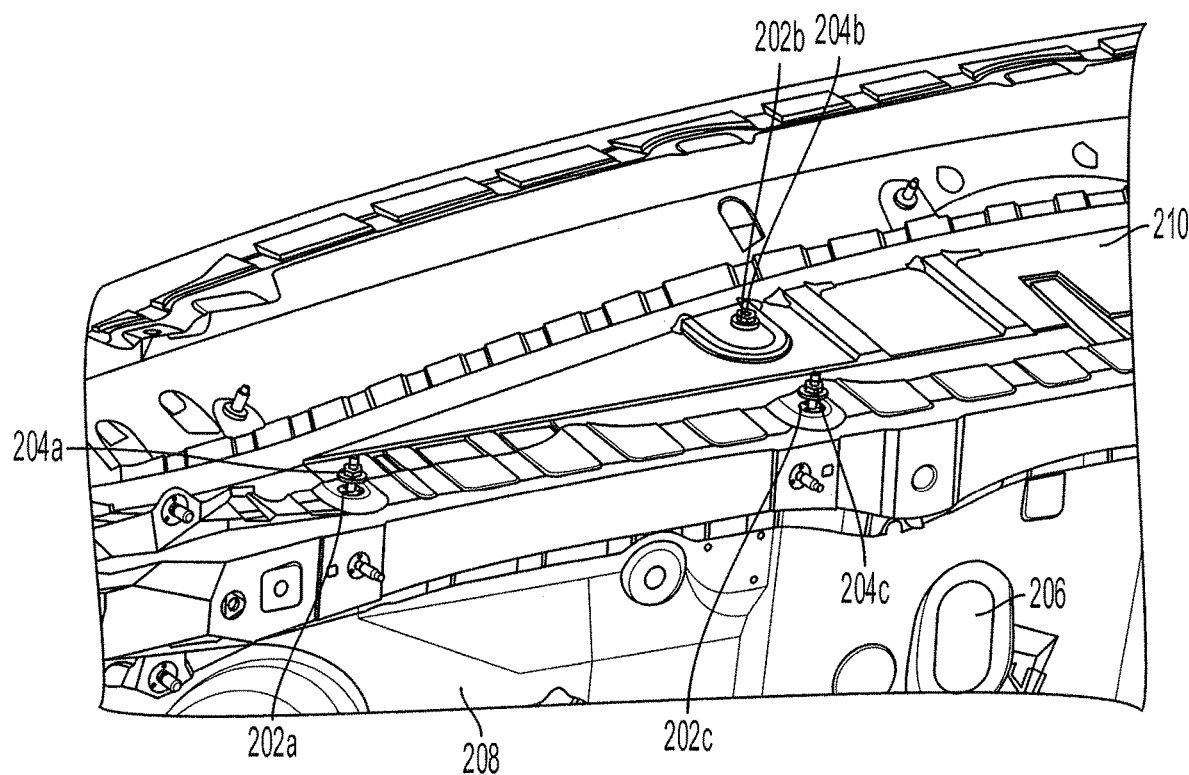
FIG. 2A shows an example dash panel where the HUD unit assembly of FIG. 1 is installed according to an aspect of the invention.

FIG. 2A shows the dash panel 108. The dash panel 108 includes the cowl 110. The cowl 110 is a front interior wall between the engine compartment and the passenger compartment. The front interior wall may have a vertical wall portion 208 and a horizontal vehicle-forward facing portion 210 that is perpendicular to the vertical wall portion 208 and lies toward the front of the vehicle. The cowl 110 may have one or more cable or wire openings 206 that allow cables or wires to be strung through from the engine compartment of the vehicle. The cowl 110 has one or more stud holes 202a-c on the horizontal vehicle-forward facing portion 210, which may be threaded to receive one or more studs 204a-c or other fasteners. The one or more stud holes 202a-c are positioned such that when the HUD unit 102 is installed and mounted to the cowl 110, the display 118 of the HUD unit 102 is positioned within a line of sight of one or more users in the passenger compartment of the vehicle. This allows the HUD unit 102 and the HUD guard device 104 to be mounted to the cowl 110 to secure the HUD unit 102 to the cowl 110 so that the display 118 is visible to individuals within the passenger compartment.

Figure 2B:
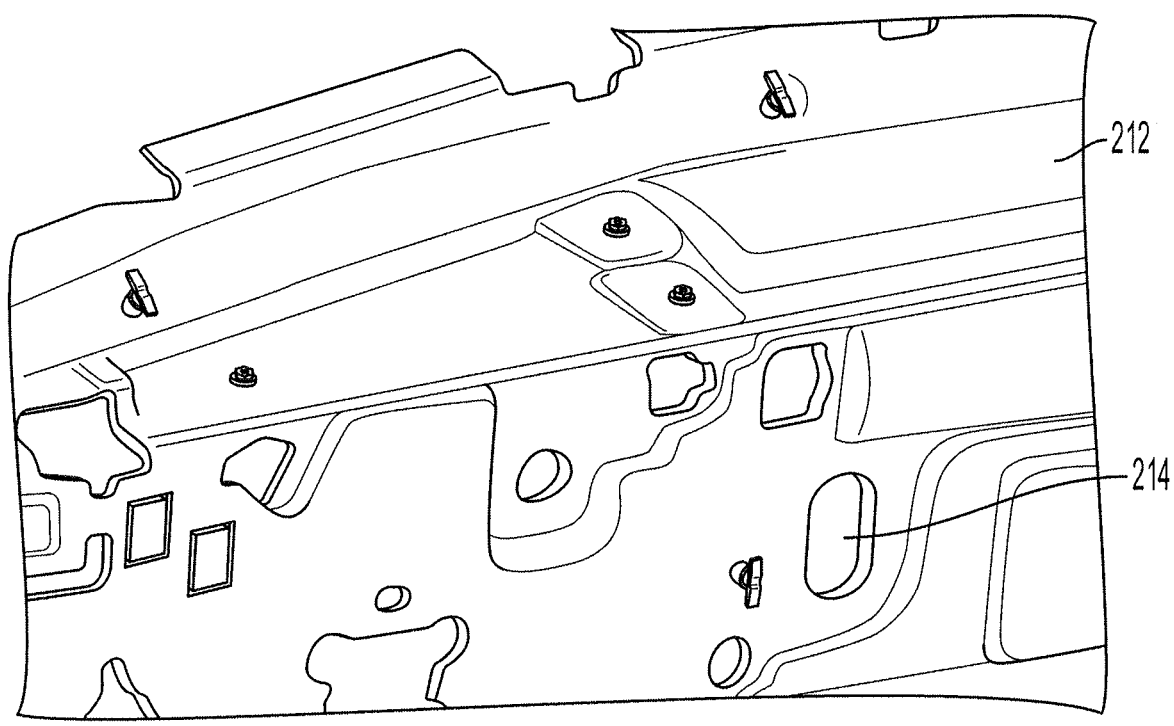
FIG. 2B shows an example dash silencer pad installed on the dash panel of FIG. 2A according to an aspect of the invention.

The dash silencer pad 212 may sit on top of the dash panel 108, as shown in FIG. 2B for example. The dash silencer pad 212 may reduce noise and vibrations emanating from the engine compartment, such as from the engine, into the vehicle passenger compartment. The dash silencer pad 212 may have one or more openings 214 that align with the one or more cable or wire openings 206 and/or the one or more stud holes 202a-c.

Figure 3:
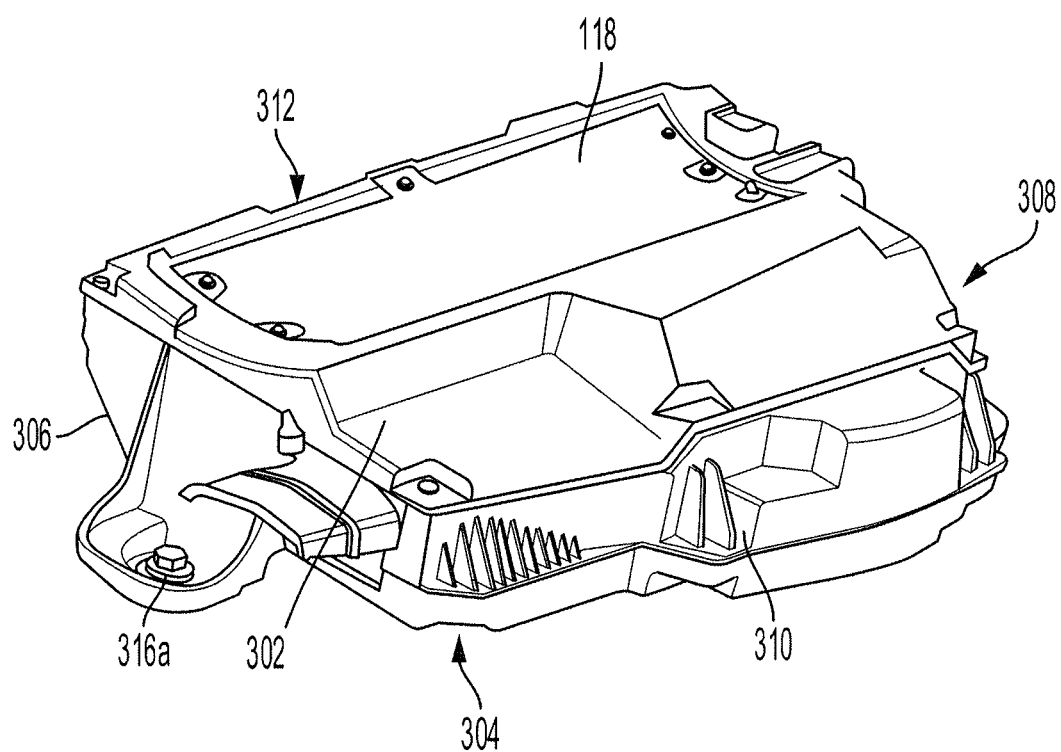
FIG. 3 shows an example HUD unit of the HUD unit assembly of FIG. 1 according to an aspect of the invention.

The HUD unit assembly 100 includes a HUD unit 102. FIG. 3 shows the HUD unit 102. The HUD unit 102 has a top surface 302, a bottom surface 304, two side surface 306, 308, a front surface 310 and a back surface 312. The HUD unit 102 has a display 118 on the top surface 302. The display 118 may be used to display information to a driver of the vehicle and/or receive user input from the driver. The HUD unit 102 may have one or more openings 316a-c. The one or more openings 316a-c align with the one or more stud holes 202a-c when the HUD unit 102 is positioned in its final installed position and may receive the one or more studs 204a-c. When the one or more studs 204a-c are inserted into the one or more openings 316a-c and fastened into the one or more stud holes 202a-c, the one or more studs 204a-c may secure and install the HUD unit 102 to the cowl 110 and maintain the HUD unit 102 in a fixed position on the cowl 110 in the final installed position.

Figure 4:
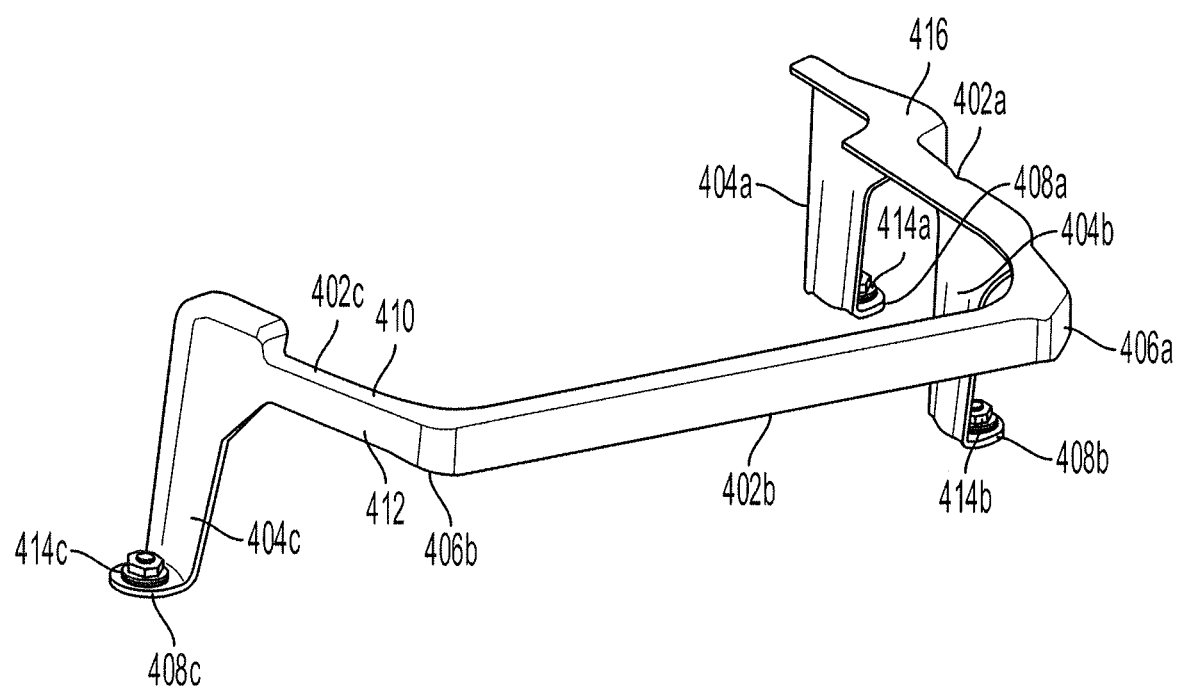
FIG. 4 shows an example HUD guard device of the HUD unit assembly of FIG. 1 according to an aspect of the invention.

The HUD unit assembly 100 includes a HUD guard device 104 that protects the HUD unit 102 during installation. FIG. 4 shows the HUD guard device 104. The HUD guard device 204 may be a frame or other enclosure that is mounted with the HUD unit 102 to the cowl 110 of the vehicle and protects the HUD unit 102 from contact with the instrument panel 116 during installation of the instrument panel 116. The HUD guard device 204 may retain and hold the HUD unit 102 in a fixed position on the cowl 110.

The HUD guard device 204 includes one or more elongated members 402a-c, one or more curved members 406a-b, one or more leg members 404a-c, and one or more foot members 408a-c. The one or more elongated members 402a-c include a first side elongated member 402a, a front elongated member 402b and/or a second side elongated member 402c and may be positioned along the perimeter of the HUD unit 102 to protect the HUD unit 102 from impact with the instrument panel 116 or other components of the vehicle. The one or more elongated members 402a-c may interface with or may be slightly raised from the surfaces of the HUD unit 102 to protect the HUD unit 102 from the instrument panel 116 when the instrument panel 116 is installed. In some implementations, the one or more elongated members 402a-c may have a snake-like portion 416 within a central portion of the one or more elongated members 402a-c or may be otherwise curved and/or be shaped to conform to the dimensions and/or shape of the HUD unit 102.

The different elongated members 402a-c each protect a different side or surface of the HUD unit 102. For example, a first side elongated member 402a may be positioned along and interface with the edge formed by the top surface 302 of the HUD unit 102 and the side surface 308 of the HUD unit 102. In another example, a front elongated member 402b may be positioned along and interface with the edge formed by the top surface 302 of the HUD unit 102 and the front surface 310 of the HUD unit 102. In another example, a second side elongated member 402c may be positioned along and interface with the edge formed by the top surface 302 of the HUD unit 102 and the other side surface 306 of the HUD unit 102.

Moreover, the different elongated members 402a-c may be connected to, coupled or integrally formed with a curved member 406a-b to connect two different elongated members 402a-c to form the frame of the HUD unit 102. The curved members 406a-b may wrap around and protect the corners of the HUD unit 102. The one or more elongated members 402a-c each may have two ends. When the HUD guard device 104 is mounted on the HUD unit 102, the first side elongated member 402a and the second side elongated member 402c are positioned along the side surfaces of the HUD unit 102 and may span the width of the HUD unit 102 outward away from the front of the vehicle and toward the passenger compartment of the vehicle. The first side elongated member 402a and the second side elongated member 402c may have an end that is proximal or closest toward the attachment to a curved member 406a-b and an end that is distal or farthest from the attachment to the curved member 406a-b. The first side elongated member 402a and the second side elongated member 402c may each connect to, couple to or be integrally formed with a curved member 406a-b, respectively, which connect to, couple to or is integrally formed with ends of the front elongated member 402b. The front elongated member 402 may be positioned in between the curved members 406a-b.

Each of the one or more elongated members may have a first planar portion 410 that is parallel to a top surface 302 of the HUD unit 102 and a second planar portion 412 that is perpendicular to the top surface 302 of the HUD unit 102. The two portions 410, 412 wrap around and conform to the edges of the HUD unit 102, which protects the edges and surfaces of the HUD unit 102 from collisions. For example, the planar portions 410, 412 of the first side elongated member 402a wraps around and conforms to the edge formed by the top surface 302 and the side surface 308 of the HUD unit 102. In another example, the planar portions 410, 412 of the front elongated member 402 wraps around and conforms to the edge formed by the top surface 302 and the front surface 310 of the HUD unit 102. In another example, the planar portions 410, 412 of the second elongated member 402c wraps around and conforms to the edge formed by the top surface 302 and the side surface 306.

The one or more leg members 404a-c may be coupled to, connected to and/or integrally formed with the second planar portions 412 of the one or more elongated members 402a-c. The one or more leg members 404a-c may have a top end that is coupled to, connected to or integrally formed with the second planar portions 412 of the one or more elongated members 402a-c and a bottom end that couples with and/or is integrally formed with a foot member that interfaces with a portion of the HUD unit 102. For example, the leg members 404a-b are connected to the second planar portion 412 of the first side elongated member 402a and the leg member 404c is connected to the second planar portion 412 of the second side elongated member 402c. The one or more leg members 404a-b are positioned with a gap in between and opposite the other leg member 404c to provide support to the frame of the HUD guard device 104.

Since the one or more leg members 404a-c are coupled to, connected to or integrally formed with the second planar portion 412 of one of the one or more elongated members 402a-c, the one or more leg members 404a-c are perpendicular to the first planar portion 410 of the one or more elongated members 402a or 402c and run parallel to the side surfaces 306, 308 of the HUD unit 102. The one or more leg members 404a-c each have or are integrally formed with a foot member 408a-c. The one or more foot members 408a-c each have a portion that is parallel to a bottom surface of the HUD unit 102 with an opening 414a-c. The openings 414a-c may each receive a stud 204a-c or other fastener to mount the HUD guard device 104 with the HUD unit 102 onto the cowl 110 to protect the HUD unit 102 during installation of the instrument panel 116 and retain the HUD unit 102 in a fixed position on the cowl 110. That is, the one or more foot members 408a-c may couple and interface with the HUD unit 102 to secure the HUD unit 102 to the cowl 110. For example, the leg member 404a is coupled to the foot member 408a, the leg member 404b is coupled to the foot member 408b and the leg member 404c is coupled to the foot member 404c, and when studs 204a-c are screwed or otherwise inserted into the openings 414a-c, the openings 316 and stud holes 202a-c, the HUD guard device 104 and the HUD unit 102 are fixed to the cowl 110.

During installation of the HUD subassembly, the dash silencer pad 202 may be installed on top of the dash panel 108. Then, the HUD unit 102 may be installed in a recess within the horizontal vehicle-forward facing portion 210 of the dash panel 108, and the openings 316 are aligned with the one or more stud holes 202a-c. Finally, the HUD guard device 204 is installed and mounted on the HUD unit 102. The openings 414a-c are aligned with the one or more stud holes 202a-c and the openings 316a-c, and one or more studs 204a-c are inserted into the one or more stud holes 202a-c through the openings 316a-c, 414a-c to secure the HUD guard device 104 on the HUD unit 102 in a fixed position on the dash panel 108.

The HUD unit assembly 100 has an instrument panel (IP) guard device 106, which may be formed from a rigid material, such as a metal, carbon, plastic or other polymer. The IP guard device 106 may be fixed, connected to, fastened to or otherwise coupled to the defroster nozzle 114 and be used to guide the instrument panel 116 during installation of the instrument panel 116.

Figure 5A:
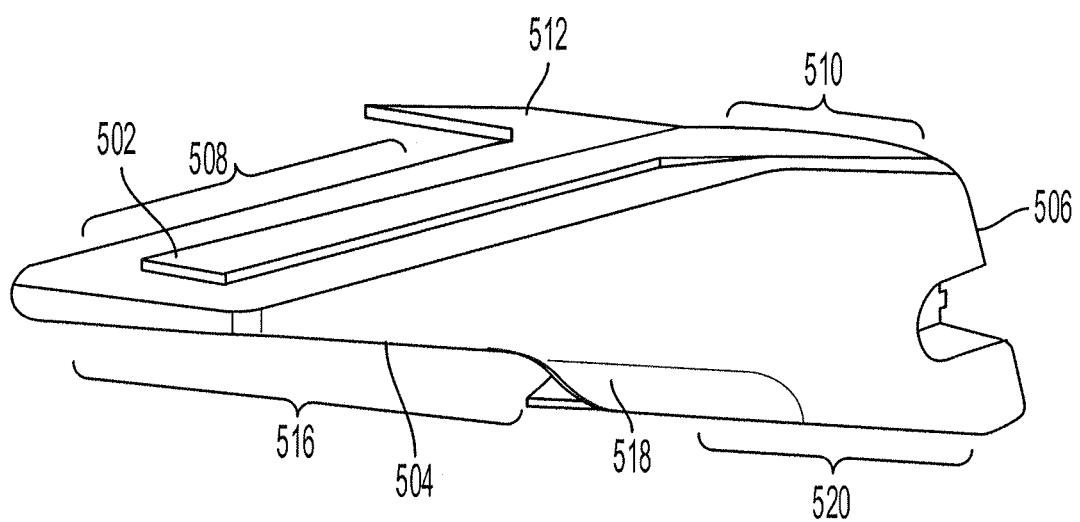
FIG. 5A shows an example IP guard device of the HUD unit assembly of FIG. 1 according to an aspect of the invention.

FIG. 5A shows the IP guard device 106. The IP guard device 106 has a top surface 502, a bottom surface 504 and a back surface 506. The top surface 502, bottom surface 504 and the back surface 506 may be integrally formed as a singular piece or as a modular piece that is fastened, connected or otherwise coupled together to enclose, surround or otherwise encapsulate a cavity 522 within the IP guard device 106.

The top surface 502 may have a distal portion 508 that is distal or away from the attachment or interface of the back surface 506 with a portion 120 of the defroster nozzle 114 ("defroster nozzle portion") that holds the IP guard device 106 and a proximal portion 510 that is proximal or closest to the attachment or interface of the back surface 506 with the defroster nozzle portion 120 that holds the IP guard device 106. The distal portion 508 may be angled downward and substantially parallel to a windshield when the HUD unit assembly 100 is installed within the vehicle, whereas, the proximal portion 510 may be angled upward away from the defroster nozzle portion 120. The distal portion 508 may be connected to, coupled with or integrally formed with a distal portion 516 of the bottom surface 504 to form a tapered edge that provides clearance between the instrument panel 116 and the HUD unit 102 and the proximal portion 510 may be connected to, coupled with or integrally formed with the back surface 506.

The top surface 502 may have an extended portion 512, which provides a larger width or surface area for the back surface 506 to couple with the defroster nozzle portion 120. The back surface 506 may be angled substantially parallel to the defroster nozzle portion 120 to interface with and couple to the defroster nozzle portion 120. The back surface 506 may have an opening 528 and a recess 530. The defroster nozzle portion 120 may have a fastener hole 608 and a protrusion hole 610. The instrument panel 116 may have a protrusion, such as a locating pin 612, that may be inserted into the recess 530 through the protrusion hole 610 on the defroster nozzle portion 120. The locating pin 612 guides or aligns the IP guard device 106 with the defroster nozzle portion 120. Once aligned, the opening 528 may receive a fastener that is then inserted through the opening 528 and fastener hole 608 of the defroster nozzle portion 120 to connect the IP guard device 106 with the defroster nozzle portion 120.

The bottom surface 504 may have a distal portion 516, a proximal portion 520 and a center portion 518 in between the distal portion 516 and the proximal portion 520. The bottom surface 504 may have a step-like structure such that the distal portion 516 of the bottom surface 504 is angled relative to the distal portion 508 of the top surface 502 at an angle that is less than the angle of the center portion 518 of the bottom surface 504 relative to the distal portion 508 of the top surface 502. Moreover, the proximal portion 520 of the bottom surface 504 may have a similar angle relative to the distal portion 508 of the top surface 502 as the distal portion 516 of the bottom surface 504, which is less than the angle of the center portion 518 of the bottom surface 504. The distal portions 508, 516 of the top surface 502 and bottom surface 504, respectively, may be longer in length than the respective proximal portions 510, 520 of the top surface 502 and bottom surface 504, respectively.

Figure 5B:
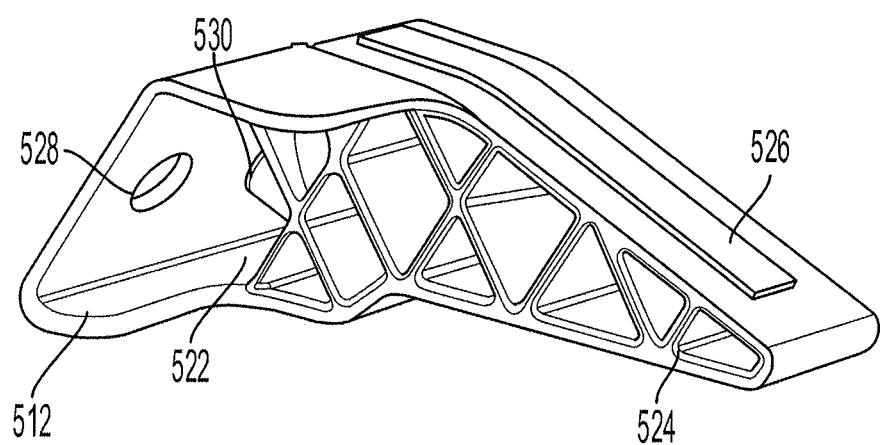
FIG. 5B shows an example cross-sectional view of the IP guard device of the HUD unit assembly of FIG. 1 according to an aspect of the invention.

The top surface 502, the bottom surface 504 and the back surface 506 enclose, surround or otherwise may be formed around to encapsulate a cavity 522. FIG. 5B shows a cross-sectional area of the IP guard device 106 showing the cavity 522 within the IP guard device 106. The IP guard device 106 may have one or more support beams 524 that connect a first inner wall of one of the top surface 502, bottom surface 504 or back surface 506, with a second inner wall of another one of the top surface 502, the bottom surface 504 or the back surface 506 that is opposite the first inner wall. The one or more support beams 524 may be made of a similar material to that of the surfaces 502, 504, 506 of the IP guard device 106.

In some implementations, there are multiple support beams 524 within the cavity and two or more of the multiple support beams 524 may intersect. The one or more support beams 524 may be arranged in a cross or "X" structure, in a grid pattern, in a diagonal structure or other arrangement. The one or more support beams 524 within the cavity 522 provide additional structural support to the IP guard device 106, which makes the IP guard device 106 more durable and able to withstand collisions by the instrument panel 116 during installation.

The IP guard device 106 may have a piece of felt 526 or other material. The piece of felt 526 may be used to minimize noise and/or vibrations between the IP guard device 106 and the instrument panel 116 when the instrument panel 116 is installed over the HUD unit 102 and HUD guard device 104.

During installation of the IP subassembly, the IP guard device 106 is installed on, connected to or otherwise coupled with the defroster nozzle portion 120 of the defroster nozzle 114. The defroster nozzle portion 120 is aligned with the IP guard device 106. A locating pin 612 or other protrusion may be used to align or guide the IP guard device 106 with the defroster nozzle portion 120. Then, a screw or other fastener may be inserted through the opening 528 of the IP guard device and a fastener hole 608 on the defroster nozzle portion 120 to secure the IP guard device 106 with the defroster nozzle portion 120 to connect or couple the IP guard device 106 with the defroster nozzle portion 120.

Figure 6A:
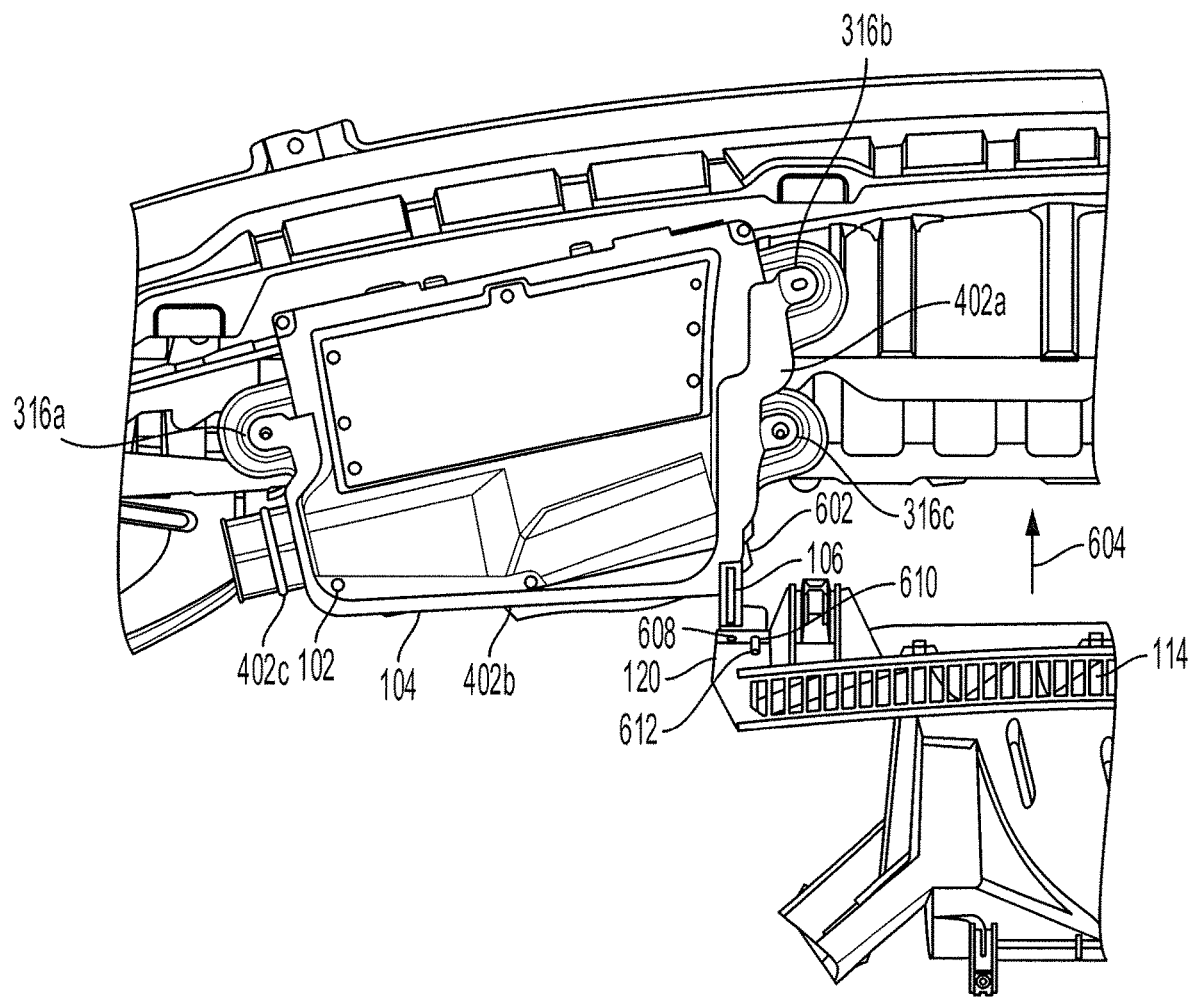
FIG. 6A shows an example top perspective view of the initial contact between the IP guard device and the HUD guard device of the HUD unit assembly of FIG. 1 during installation of the IP according to an aspect of the invention.
Figure 6B:
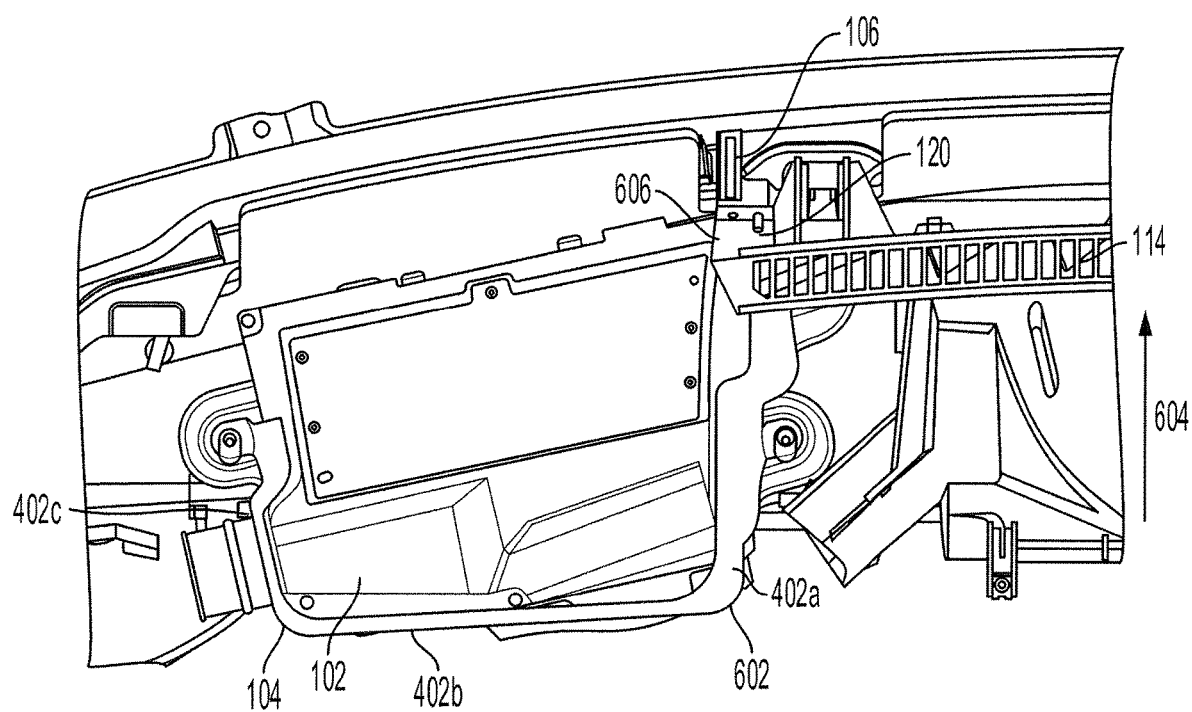
FIG. 6B shows an example top perspective view of the final installed position of the components of the HUD unit assembly of FIG. 1 according to an aspect of the invention.
Figure 6C:
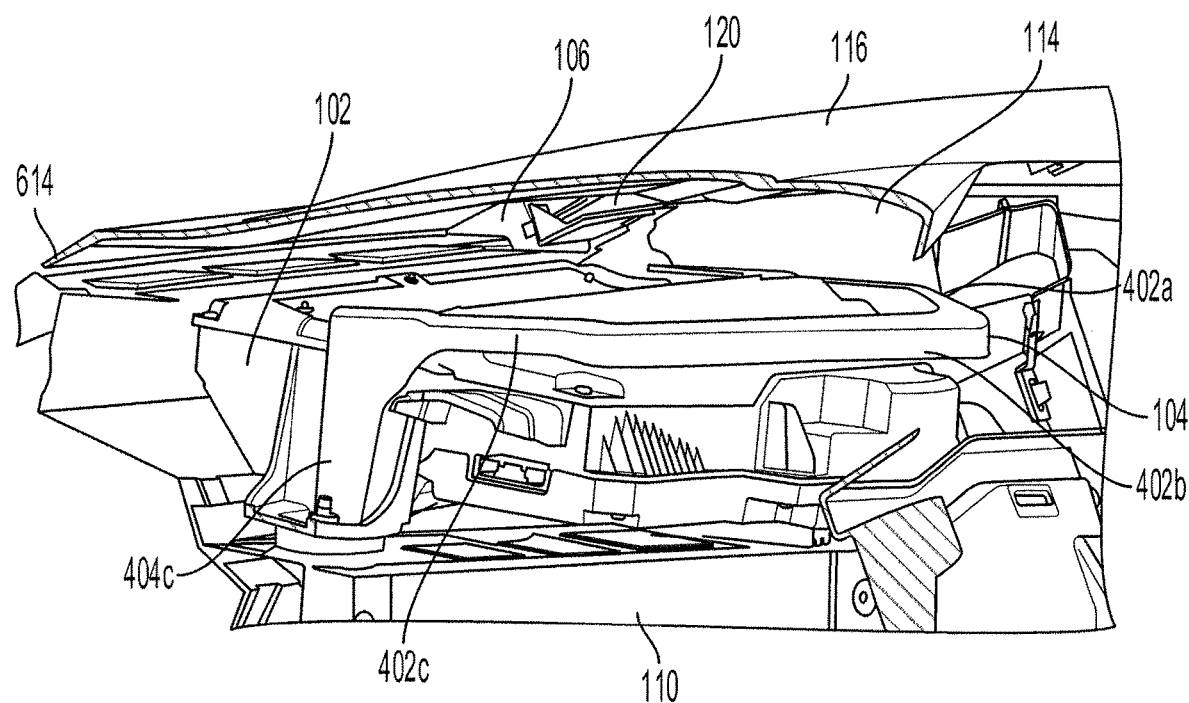
FIG. 6C shows a cross-sectional view of the HUD unit assembly of FIG. 1 in the final installed position according to an aspect of the invention.

Once the IP subassembly is assembled, the IP subassembly is installed to the HUD subassembly. The tapered edge of the IP guard device 106 is placed or positioned to contact the HUD guard device 104 at the location 602, which is near or in proximity to the proximal end of the first side elongated member 402a of the HUD guard device 104, as shown in FIG. 6A for example. FIG. 6A shows a top perspective view of the initial contact between the IP guard device 106 and the HUD guard device 104. The IP guard device 106 slides or guides the instrument panel 116 in the direction 604 over the first side elongated member 402a into a final installed position 606, as shown in FIGS. 6B-6C for example. FIG. 6B shows a top perspective view of the final installed position of the IP guard device 106 and FIG. 6C shows a cross-sectional view of IP subassembly including the instrument panel 116 in the final installed position. The IP guard device 106 contacts with and interfaces with the HUD guard device 104 during the installation of the instrument panel 116 to protect the HUD unit 102 and the tip 614 of the instrument panel 116.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A heads up display (HUD) guard device for a HUD unit of a vehicle, comprising:
   a first elongated member positioned on one or more surfaces of the HUD unit and along an edge of the HUD unit and configured to protect the one or more surfaces of the HUD unit and the edge of the HUD unit during installation of an instrument panel of the vehicle;

a first leg member having a first end and a second end, the first end being coupled to the first elongated member and the second end being configured to couple and interface with the HUD unit to support the first elongated member; and a second leg member having a first end and a second end, the first end being coupled to or integrally formed with the first elongated member and the second end being configured to couple and interface with the HUD unit to support the first elongated member.

2. The HUD guard device of claim 1, wherein the first elongated member has a first planar portion that is parallel to a top surface of the HUD unit and a second planar portion that is perpendicular to the top surface of the HUD unit and parallel to a side surface of the HUD unit, wherein the first planar portion and the second planar portion are integrally formed to conform or wrap around the edge of the HUD unit.

3. The HUD guard device of claim 2, wherein the first planar portion interfaces with and protects the top surface of the HUD unit, and the second planar portion interfaces with and protects the side surface of the HUD unit.

4. The HUD guard device of claim 1, wherein the first leg member and the second leg member each have a foot member, wherein the foot member of the first leg member and the foot member of the second leg member each have an opening that is configured to receive a fastener that is inserted into the opening to fasten the foot members of the first and second leg members and the HUD unit to a dash panel of the vehicle.

5. The HUD guard device of claim 4, further comprising:
a first curved portion having a first end that is integrally formed with the first elongated member and a second end that is opposite and angled perpendicular to the first end; and
a second elongated member coupled to or integrally formed with the second end of the first curved portion.

6. The HUD guard device of claim 5, further comprising:
a second curved portion having a first end that is integrally formed with the second elongated member and a second end that is opposite and angled perpendicular to the first end of the second curved portion, wherein the second end of the second curved portion is parallel to the first elongated member; and
a third elongated member coupled to or integrally formed with the second end of the second curved portion.

7. The HUD guard device of claim 6, further comprising:
a third leg member having a first end and a second end, the first end of the third leg member being coupled to or integrally formed with the third elongated member and the second end of the third leg member being configured to couple and interface with the HUD unit.

8. The HUD guard device of claim 7, wherein the third leg member has a foot member, wherein the foot member of the third leg member has an opening that is configured to receive a fastener that is inserted into the opening to fasten the foot member of the third leg member and the HUD unit to a dash panel of the vehicle.

9. The HUD guard device of claim 6, wherein the first curved portion, second curved portion, first elongated member, the second elongated member and the third elongated member are integrally formed and are formed from a rigid material.

10. An instrument panel (IP) guard device, comprising:
a top surface having a distal portion that is angled downward when installed and a proximal portion that is angled upward away from a portion of a defroster nozzle that holds the instrument panel guard device;
a bottom surface having a distal portion, a proximal portion and a center portion between the distal portion and the proximal portion; and
a back surface coupled in between the top surface and the bottom surface, wherein the back surface is angled substantially parallel to the portion of the defroster nozzle and is configured to interface with and couple to the portion of the defroster nozzle.

11. The instrument panel guard device of claim 10, wherein the distal portion of the top surface and the distal portion of the bottom portion are farther away from the portion of the defroster nozzle that is configured to hold the instrument panel guard device and the proximal portion of the top surface and the proximal portion of the bottom portion are closer to the portion of the defroster portion is configured to hold the instrument panel guard device.

12. The instrument panel guard device of claim 11, wherein the distal portions of the top surface and bottom surface are longer in length than the proximal portions of the top surface and bottom surface, respectively.

13. The instrument panel guard device of claim 11, wherein the back surface has an opening and a recess, wherein the opening is configured to receive a fastener that connects the back surface and the portion of the defroster nozzle and the recess is configured to receive a locating pin that aligns portion of the defroster nozzle, the IP guard device and an instrument panel of the vehicle.

14. The instrument panel guard device of claim 11, wherein the distal portion of the top surface and the distal portion of the bottom surface form a tapered edge that is configured to provide clearance between an instrument panel and a heads up display (HUD) unit of a vehicle when the instrument panel is installed.

15. The instrument panel guard device of claim 10, further comprising:
a piece of felt that is attached to the distal portion of the top surface and that is configured to reduce vibration noises between the instrument panel guard device and an instrument panel.

16. A heads up display assembly for a vehicle, comprising:
a heads up display unit configured to display information to a user of the vehicle;
an instrument panel guard device positioned on a defroster nozzle to guide installation of an instrument panel; and
a heads up display guard device positioned along a perimeter of the heads up display (HUD) unit and configured to protect the heads up display unit from damage during installation of the instrument panel.

17. The heads up display assembly of claim 16, wherein the heads up display guard device is further configured to guide the instrument panel from an initial position to a final position during installation of the instrument panel.

18. The heads up display assembly of claim 16, wherein the heads up unit display guard device is mounted along the perimeter of the HUD unit and includes:
a first elongated member positioned on one or more surfaces HUD unit and along an edge of the HUD unit and configured to protect the one or more surfaces of the HUD unit and the edge of the HUD unit during installation of an instrument panel of the vehicle;

a first leg member having a first end and a second end, the first end being coupled to the elongated member and the second end being configured to couple and interface with the HUD unit to support the first elongated member; and a second leg member having a first end and a second end, the first end being coupled to or integrally formed with the first elongated member and the second end being configured to couple and interface with the HUD unit.

19. The heads up display assembly of claim 18, and further includes:

a first curved member having a first end that is integrally formed with the first elongated member and a second end that is opposite and angled perpendicular to the first end;

a second elongated member coupled to or integrally formed with the second end of the first curved member;

a second curved member having a first end that is integrally formed with the second elongated member and a second end that is opposite and angled perpendicular to the first end of the second curved member, wherein the second end is parallel to the first elongated member;

a third elongated member coupled to or integrally formed with the second end of the second curved member; and a third leg member having a first end and a second end, the first end being coupled to or integrally formed with the third elongated member and the second end being configured to couple and interface with the HUD unit.

20. The heads up display assembly of claim 16, wherein the instrument panel guard device includes:

a top surface having a distal portion that is angled downward when installed and a proximal portion that is angled upward away from a portion of a defroster nozzle that holds the instrument panel guard device;

a bottom surface having a distal portion, a proximal portion and a center portion between the distal portion and the proximal portion; and a back surface coupled in between the top surface and the bottom surface, wherein the back surface is angled substantially parallel to the portion of the defroster nozzle.

* * * * *